United States Patent
Cao et al.

(10) Patent No.: US 9,741,025 B2
(45) Date of Patent: Aug. 22, 2017

(54) POINT OF SALE DATA SYSTEMS AND METHODS

(75) Inventors: Roger Cao, Tomball, TX (US); Kent E Biggs, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 13/818,361

(22) PCT Filed: Jan. 18, 2011

(86) PCT No.: PCT/US2011/021567
§ 371 (c)(1),
(2), (4) Date: Feb. 22, 2013

(87) PCT Pub. No.: WO2012/099575
PCT Pub. Date: Jul. 26, 2012

(65) Prior Publication Data
US 2013/0159120 A1    Jun. 20, 2013

(51) Int. Cl.
*G06Q 20/20* (2012.01)
*G07G 1/14* (2006.01)
*G06F 15/16* (2006.01)

(52) U.S. Cl.
CPC ............. *G06Q 20/202* (2013.01); *G07G 1/14* (2013.01)

(58) Field of Classification Search
USPC ................................ 705/21; 717/166; 726/15
See application file for complete search history.

(56) References Cited

U.S. PATENT DOCUMENTS

| | | | |
|---|---|---|---|
| 7,609,649 B1 | 10/2009 | Bhandari et al. | |
| 2006/0112379 A1* | 5/2006 | Chirakansakcharoen | G06F 9/445 717/166 |
| 2006/0212644 A1 | 9/2006 | Acton et al. | |
| 2006/0272015 A1* | 11/2006 | Frank | H04L 29/12009 726/15 |
| 2008/0171607 A1 | 7/2008 | Minard et al. | |
| 2009/0070081 A1 | 3/2009 | Saenz et al. | |

(Continued)

FOREIGN PATENT DOCUMENTS

| | | |
|---|---|---|
| EP | 0 655 717 A2 | 5/1995 |
| EP | 1 450 324 A1 | 8/2004 |

(Continued)

OTHER PUBLICATIONS

Lawson, Stephen. HP Expands Virtual Storage Offerings. Mar. 10, 2009. www.infoworld.com/print/2303.

(Continued)

*Primary Examiner* — Scott Zare
*Assistant Examiner* — Reva R Danzig
(74) *Attorney, Agent, or Firm* — HP Patent Department (57) ABSTRACT

Point of sale (POS) data systems, methods, and apparatuses are provided. A POS data system (100) can include a plurality of coupled POS devices (110) each including a processor and a data storage device (120). The data storage device can include logic (130) which, when executed by the processor provides point of sale functionality; data storage (140) accessible to at least one of the remaining coupled POS devices; and logic to allocate at least a portion of the data generated by a first POS device on at least one of the remaining coupled POS devices.

19 Claims, 5 Drawing Sheets

(56) References Cited

U.S. PATENT DOCUMENTS

2009/0216788 A1  8/2009  Rao et al.
2010/0110882 A1* 5/2010  Murugan ................. H04J 3/08
                                                370/225

FOREIGN PATENT DOCUMENTS

WO    WO-03/019488 A1    3/2003
WO    WO-2008/058012 A2  5/2008

OTHER PUBLICATIONS

Retail Pro International, LLC—Retail Software and Point of Sale Software. Data Protection/Disaster Recovery—Planning for the Unthinkable.
International Search Report Date of Mailing Sep. 14, 2011. International Application No. PCT/US2011/021567, filing date Jan. 18, 2011.

* cited by examiner

POINT OF SALE DATA SYSTEMS AND METHODS

BACKGROUND OF THE INVENTION

Description of the Related Art

Electronic point of sale devices have enjoyed broad success due to their flexibility and accuracy. Each point of sale device typically includes a scanning device, an inventory database that includes pricing data, and the systems necessary to handle consumer transactions. Transactional data from each of the point of sale devices is frequently stored in a local, non-volatile, memory within the point of sale device. Data from each of the point of sale devices is often transmitted to a central location for aggregation and collection. While such electronic point of sale systems offer numerous advantages, data loss, including loss of transactional data, for example due to a malfunction of the point of sale device, remains an ever-present risk.

BRIEF DESCRIPTION OF THE DRAWINGS

Advantages of one or more disclosed embodiments may become apparent upon reading the following detailed description and upon reference to the drawings in which.

DETAILED DESCRIPTION

Point of sale (POS) systems permit retailers to perform transactions and maintain accurate inventory count on a real time basis. The flexibility and accuracy offered by POS systems has accelerated their acceptance throughout the retail services industry. The ability for a retailer to track inventory in real time offers significant enhancements in minimizing inventory while at the same time maximizing product availability.

A POS station features a transaction handling system including a cash drawer and electronic payment system and a scanning device. As an item is scanned, the cost of the item is added to the total presented to the customer and the retailer's inventory count of the item is reduced. The item/cost lookup database and the inventory database are frequently maintained independently at each POS station, often on a data storage device such as a solid state drive or a hard disk drive. Periodically, the transactional data from all POS stations is collected and tabulated at a central data collection point, for example a central server, to provide total transaction and inventory counts. While the item/cost lookup and the inventory databases can be recovered in the event of any single POS station failure, the transactional data stored on the failed POS station can be lost should the failure occur prior to transmission of the transactional data from the POS station to the central data collection point.

With the decreasing cost of data storage, and the relative unavailability of smaller data storage devices, POS systems often are equipped with data storage devices having a capacity that significantly exceeds the storage requirements for the item/cost lookup database, the inventory database, and the transaction database. This extra storage is often unused, and represents a significant opportunity to improve the reliability the entire POS system by providing an opportunity to create data storage having an increased reliability using the native data storage capability provided with each of the POS devices forming the POS system.

A point of sale data system is therefore provided herein. The illustrative system can include a plurality of coupled POS devices, with each of the POS devices including a processor, and a data storage device. The data storage device can include logic, which when executed by the processor provides point of sale functionality, and data storage that is accessible to at least one of the remaining coupled POS devices. Logic can be provided across the system to allocate at least a portion of the data generated by a first POS device across at least one of the remaining coupled plurality of POS devices.

A point of sale data method is also provided herein. The illustrative method can include disposing a data storage device within each of a plurality of coupled POS devices. The data storage device can include logic which when executed by a processor provides point of sale functionality, and data storage accessible to at least one of the remaining coupled POS devices. The method can further include allocating at least a portion of the data generated by a first of the coupled POS devices in the data storage of at least one of the remaining coupled plurality of POS devices.

A point of sale data apparatus is also provided herein. The illustrative apparatus can include a processor and a data storage device accessible to at least one other connected POS apparatus. The data storage device can include logic which when executed by the processor provides a point of sale terminal and allocates data generated by the POS apparatus on at least one of the remaining coupled POS apparatuses.

Figure 1:
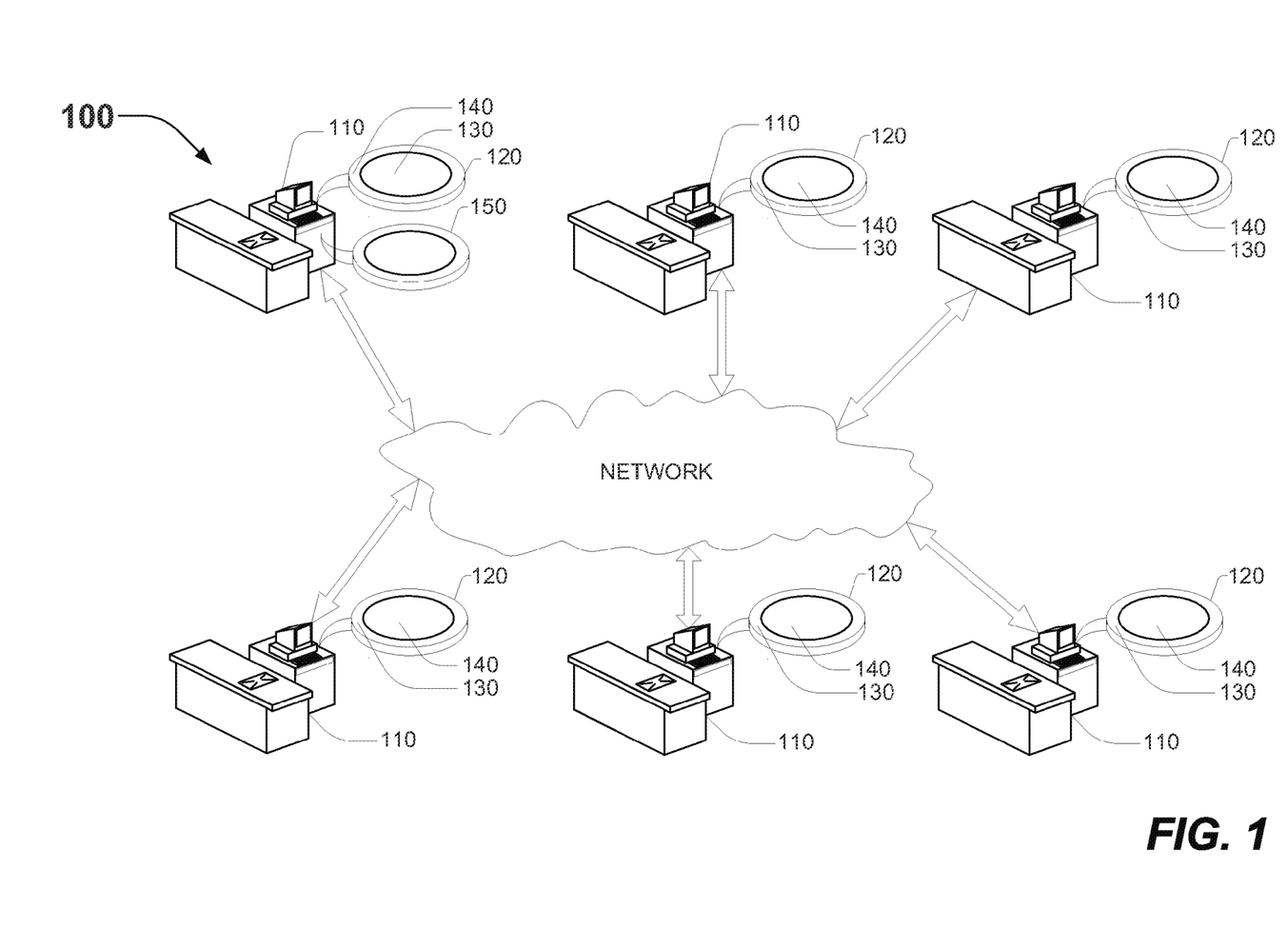
FIG. 1 is a schematic diagram depicting an illustrative point of sale data system, according to one or more embodiments described herein.

FIG. 1 is a schematic diagram depicting an illustrative point of sale data system 100, according to one or more embodiments. The system 100 can include a plurality of coupled POS stations or devices 110. The plurality of coupled POS stations 110 can communicate via one or more wired or wireless connections. Illustrative wired connections can include connections using one or more of the following interfaces or technologies: Ethernet, USB, SATA, or the like. Illustrative wireless connections can include connections using one or more of the following interfaces or technologies: 802.11 ("WiFi"), Bluetooth, RF, or the like. For simplicity and ease of discussion, a generic, non-limiting "network cloud" representation is depicted in FIG. 1.

Each of the plurality of coupled POS devices 110 can include any number of systems, devices, or any combination of systems and devices necessary to provide a functional POS device. Each of the plurality of coupled POS devices 110 can therefore include data input devices such as scanners, keyboards, pointing devices, radio frequency identification ("RFID") readers, and the like. Additionally, each POS device 110 can also include one or more data output devices such as a display device, a printer, or a wired or wireless output interface. The combination of data input and output devices on each of the plurality of coupled POS devices 110 can provide autonomous point of sale capability—for example, the ability to scan an item, lookup a price, adjust inventory counts, and provide a total transaction inventory and amount for all items scanned.

Each of the plurality of POS devices can include a processor connected to a data storage device 120. The processor can execute machine readable instruction sets or logic 130 providing all necessary POS functionality to each POS device 110. The logic 130 can be disposed in whole or in part within the data storage device 120.

Additional data can also be stored within the data storage device 120, in some embodiments, an item/cost lookup database can be disposed in whole or in part within the data storage device 120. The item/cost database can include, for example, unit cost data for at least a portion of the items stored in the database. Provision of a local item/cost database within each of the plurality of POS devices 110 can permit the ability to provide transactional services even in the absence of the network coupling the plurality of coupled POS devices 110.

In some embodiments, an inventory database can be disposed in whole or in part within the data storage device 120. The inventory database can include, for example, unit stock counts for at least a portion of the items stored in the database, for example the number of items on a retail shelf or a warehouse bay. In at least some embodiments, the inventory database can be periodically refreshed from a master inventory database reflecting not just the inventory adjustments provided by each of the plurality of POS devices 110 but also, for example, reflecting any stock receipts or transfers.

A transactional database can be disposed in whole or in part within the data storage device 120. The transactional database can include, for example, the total item count, inventory, receipts, and associated amount of all items passed through the POS device 110 over a given time period. An example would be the total item count, inventory, total cash, and total electronic transactions passed through a grocery store checkout over the course of a business day. While the item/cost and inventory databases may be identical between some or all of the plurality of POS devices 110, the transaction database generated by each of the plurality of POS devices 110 can be unique as the transactions tabulated by each of the plurality of POS devices can differ.

Notwithstanding the disposal of one or more databases as described in detail above within the data storage device 120, the data storage device 120 can have significant free data storage 140 available. Such data storage 140 can be an unintended byproduct of the decreasing availability of small capacity data storage devices 120 or the prevalence and increasing cost efficiency of high capacity data storage devices 140. In some embodiments, consumer requirements may stipulate the supply of high capacity data storage devices 120 within each of the plurality of POS devices 110. In at least some embodiments, the data storage device 120 within each of the plurality of POS devices 110 can be a high capacity data storage device having a minimum capacity of several tens to several hundreds of gigabytes (GBs) of storage, or even several terabytes (TBs) of storage all the while still retaining both attractive performance and outstanding value.

The use of such high capacity data storage devices 120 within each of the plurality of POS devices 110 can result in significant quantity of unused or "free" storage remaining available within each of the plurality of coupled POS devices 110 even after all item/cost, inventory, and transactional databases are loaded onto the data storage device 120. This additional unused data storage within each of the plurality of coupled POS devices 110 provides an opportunity to allocate, duplicate, or back-up transactional data on the storage devices 120 connected to each of the plurality of coupled POS devices 110.

A redundant array of independent disks (RAID) can provide an increased data storage functionality and reliability through the use of redundant storage devices. Although the term "disk" is used within the acronym, RAID storage can include other storage technologies such as solid-state drives and other similar technologies. The redundancy is achieved by combining multiple storage device components into a single logical unit, and distributing data across the storage devices in one of several predetermined patterns, referred to as "RAID levels". The use of a RAID storage array permits the distribution of data across multiple storage devices, while permitting the operating system to transparently address the array as single logical storage device. Using a mirrored RAID pattern (e.g. RAID 1), data originating from a first storage device, such as a first POS device 110, is mirrored repeated or copied in whole on a second storage device, such as a second POS device 110. Using a striped RAID system (e.g., RAID 0, 2, 3, 4, 5, and 6), a portion of the data generated by a first of the plurality of coupled POS devices 110 can be allocated to each of a plurality of data storage devices 120, such as the remaining plurality of coupled POS devices 110 depicted in FIG. 1.

The storage devices 120 connected to each of the plurality of coupled POS devices 110 can therefore be grouped into a single logical storage device to provide either a mirrored or striped RAID array. Such a RAID array could be used to store transactional data from all of the plurality of POS devices 110 allocated in a manner that failure of one or more of the plurality of coupled POS devices 110 would not result in a loss of the transactional data. Such an arrangement would require no additional storage capacity above and beyond that originally supplied with each of the plurality of coupled POS devices 110. In providing storage for the RAID array, the free data storage 140 can be either or both partitioned from or continuous with the remainder of the data storage device 120 in some or all of the plurality of POS devices 110.

Logic 150 providing a machine executable instruction set forming the RAID array can be provided on at least a portion of the plurality of POS devices 110. In some embodiments, the logic 150 can include one or more instructions designating one of the plurality of POS devices 110 as the primary master device controlling the RAID array formed by the plurality of coupled POS devices 110. In at least some embodiments, the logic 150 can include one or more instructions designating one or more of the plurality of coupled POS devices 110 as a secondary master device configured to monitor the one or more operating parameters (i.e., the health) of the primary master device controlling the RAID array and to assume control of the RAID array from the primary master should the performance of the primary master fail to meet one or more predetermined limits.

In some embodiments, the logic 150 can be disposed in whole or in part on each of the plurality of coupled POS devices 110 such that any of the plurality of POS devices 110 can function as the primary master controlling the RAID array, or as the secondary master device. In at least some embodiments, the logic 150 can automatically designate a new secondary master when the former secondary master device assumes control of the RAID array over a primary master operating outside of one or more predetermined parameters. Such autonomous or automatic rollover of primary and secondary master POS devices 110 can permit the rapid recovery of data from the RAID array in the event one or more of the plurality of coupled POS devices 110 fails. The ability to autonomously recover data from one or more failed POS devices can minimize the risk of data loss while preserving the coherency of the databases within the RAID array.

Figure 2:
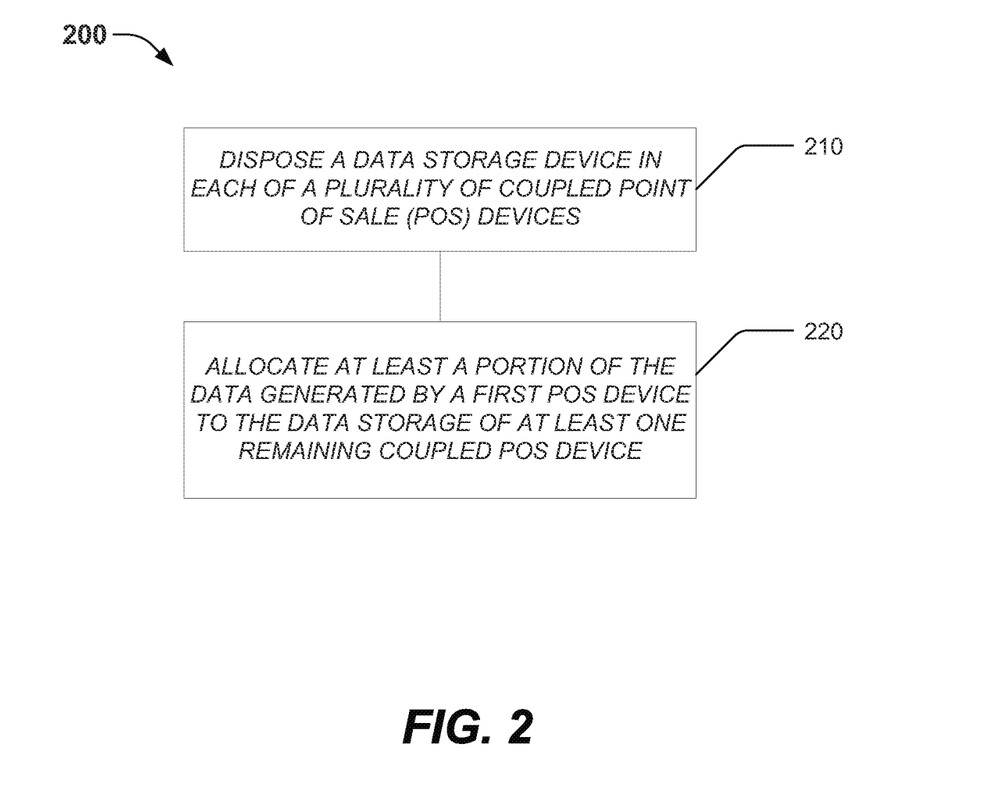
FIG. 2 is a flow diagram depicting an illustrative point of sale data method, according to one or more embodiments described herein.

FIG. 2 is a flow diagram depicting an illustrative point of sale data method 200, according to one or more embodiments. The method 200 can ensure the continuity and integrity of transactional data associated with each of a plurality of POS devices 110 is maintained through the use of a redundant array of independent disks (RAID) array formed using at least a portion of the data storage device 120 connected to each of the plurality of coupled POS devices 110.

A data storage device 120 can be connected to each of a plurality of coupled POS devices 110 at 210. The data storage device 120 can be a single storage device such as a rotating magnetic drive or a solid-state drive or a plurality or combination of rotating magnetic drives and solid state drives. The data storage device 120 can be used to store in whole, in part, or in any combination an item/cost database, an inventory database, a transactional database, logic to provide POS functionality, and logic to provide data redundancy between all or a portion of the plurality of coupled POS devices 110. In at least some embodiments, a portion of data storage device 120 disposed within each of the plurality of coupled POS devices 110 can be used to store data provided by at least one other coupled POS device 110, for example transactional data from one or more coupled POS devices 110.

At least a portion of the data generated by a first coupled POS device 110 can be allocated to the data storage of at least one remaining coupled POS device 110 at 220. In at least some embodiments, a portion of the transactional data generated by the first POS device can be allocated or duplicated in the data storage 120 of at least one remaining coupled POS device. The autonomous allocation of transactional data across at least one other coupled POS device 110 can minimize the risk for loss of the transactional data should the first POS device fail. In at least some embodiments, the transactional data from the first POS device 110 can be allocated to and stored within the data storage 120 of at least one remaining coupled POS device 110 using a striped RAID array (e.g. RAID 0). In at least some embodiments, the transactional data from the first POS device 110 can be duplicated and stored within the data storage 120 of at least one remaining coupled POS device 110 using a mirrored RAID array (e.g. RAID 1).

Figure 3:
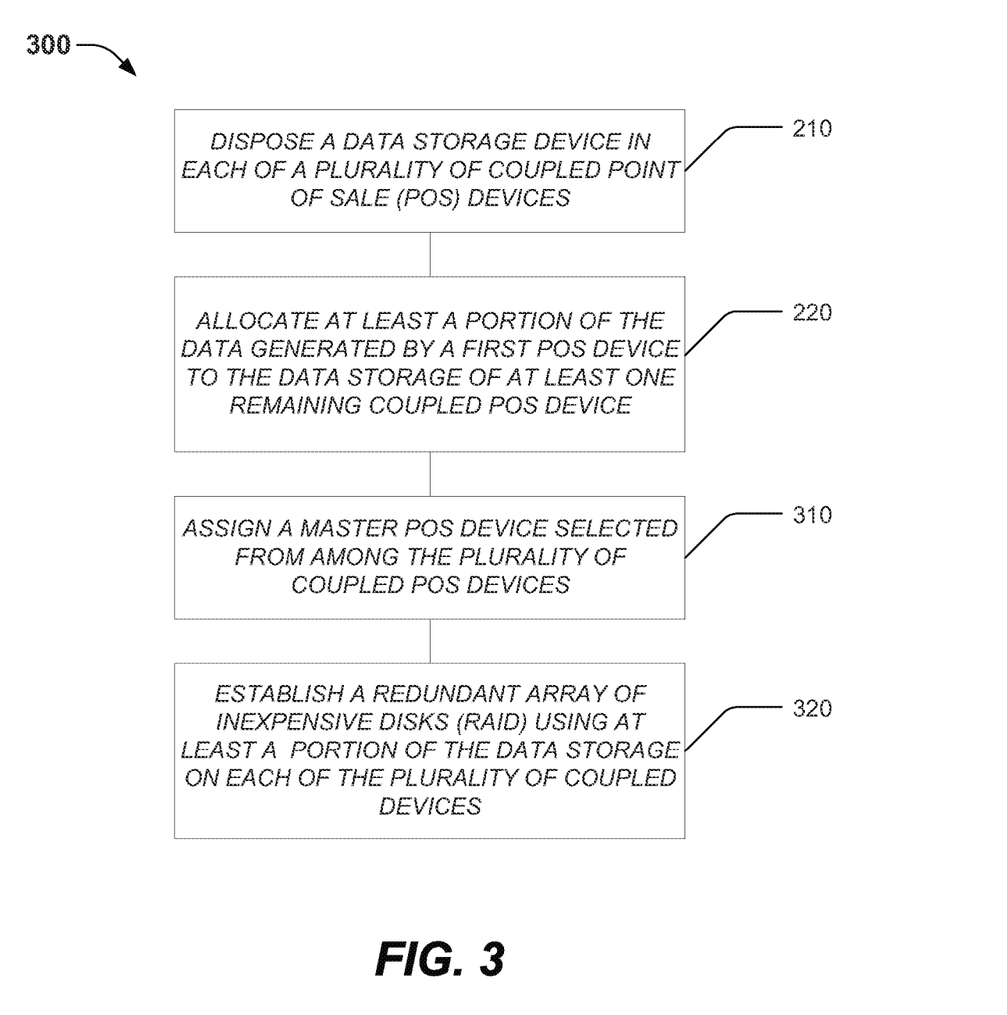
FIG. 3 is a flow diagram depicting another illustrative point of sale data method, according to one or more embodiments described herein.

FIG. 3 is a flow diagram 300 depicting another illustrative point of sale data method, according to one or more embodiments. The method 300 can provide for the selection of a primary master POS device 110 to control a redundant array of independent disks (RAID) storage array formed using the storage devices 120 connected to each of the plurality of coupled POS devices 110.

The primary master POS device 110 can be assigned at 310. The primary master POS device 110 can be selected from the plurality of POS devices 110. In some embodiments, a system user or system administrator can select the primary master POS device. In other embodiments, the primary master POS device can be autonomously selected, for example using a machine executable code or logic disposed on at least one of the plurality of coupled POS devices. Autonomously selecting the primary master can, for example, provide the benefit of seamlessly transferring control between primary master POS devices in the event one or more operating parameters of the primary master POS device fall outside of predetermined limits.

The primary master POS device 110 can establish a redundant array of independent disks (RAID) storage array using at least a portion of the data storage 120 connected to least a portion of the plurality of POS devices 110 at 320. The RAID storage array created by the primary master POS device can be a mirrored (e.g., RAID 1) array or striped (e.g. RAID 0, 2, 3, 4, 5, 6) array. Creation of a RAID storage array can provide the capability of recovering the data stored within the array should one or more storage devices 120 or POS devices 110 fail. For example, the ability to recover data from the transactional database can provide a mechanism for recovering net sales, receipts, and inventory counts in the event one or more of the plurality of coupled POS devices 110 fails.

Figure 4:
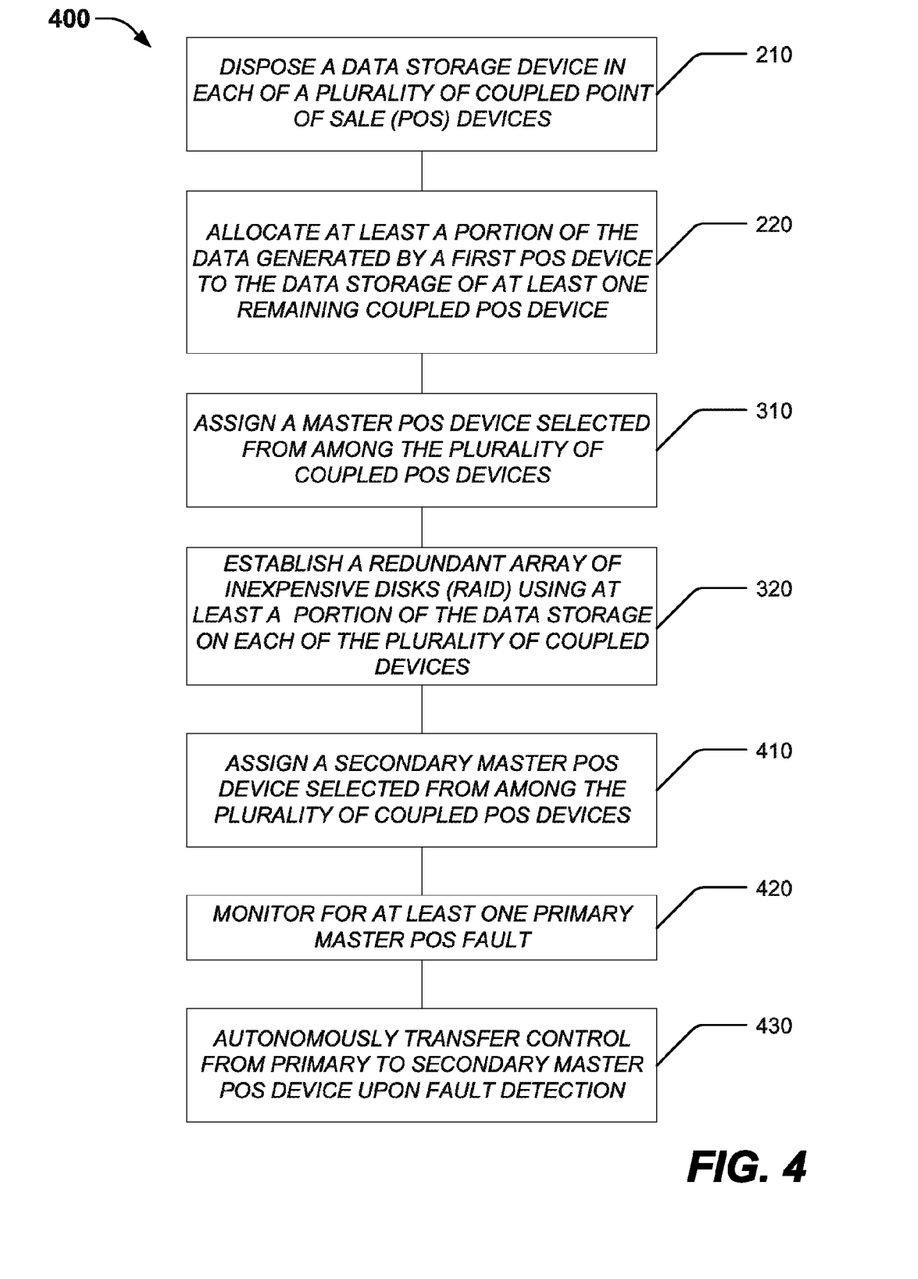
FIG. 4 is a flow diagram depicting yet another illustrative point of sale data method, according to one or more embodiments described herein.

FIG. 4 is a flow diagram depicting yet another illustrative point of sale redundancy method 400, according to one or more embodiments. The method 400 can provide for the selection of a secondary master POS device from the plurality of coupled POS devices 110 to monitor the health of the primary master POS device and autonomously transfer control of the RAID array from the primary master to the secondary master in the event a fault is detected in the primary master POS device.

A secondary master POS device can be selected from the plurality of coupled POS devices 110 at 410. The logic 150 can include instructions to assign a secondary master POS device selected from the plurality of coupled POS devices 110. In some embodiments, the logic 150 can provide for a user selected secondary master POS device. In other embodiments, the logic 150 can provide for an autonomously selected secondary master POS device, for example when the original secondary master POS device assumes control of the RAID array from a malfunctioning primary master POS device, thereby assuming the role of primary master POS device.

The logic 150 within the secondary master POS device can include logic to monitor for at least one primary master POS condition or fault at 420. The use of a secondary master POS device can improve the reliability of the RAID array by providing for proactive, autonomous, transfer of control from the primary master POS device thereby ensuring data consistency and integrity throughout the array. Providing for an organized, logical, transition from the primary master to the secondary master can improve the reliability of the RAID array to approach or match the reliability of high cost, external, data storage centers without requiring the acquisition of additional equipment since the RAID array is formed and managed using only the plurality of coupled POS devices 110.

Control of the RAID array can be autonomously transferred from the primary master to the secondary master POS device upon detection of a fault in the primary master POS device at 430. The ability to autonomously transfer control of the RAID array from the primary master to a secondary master can improve the overall reliability of the RAID array formed by the plurality of coupled POS devices to the level of a dedicated stand-alone data center.

Figure 5:
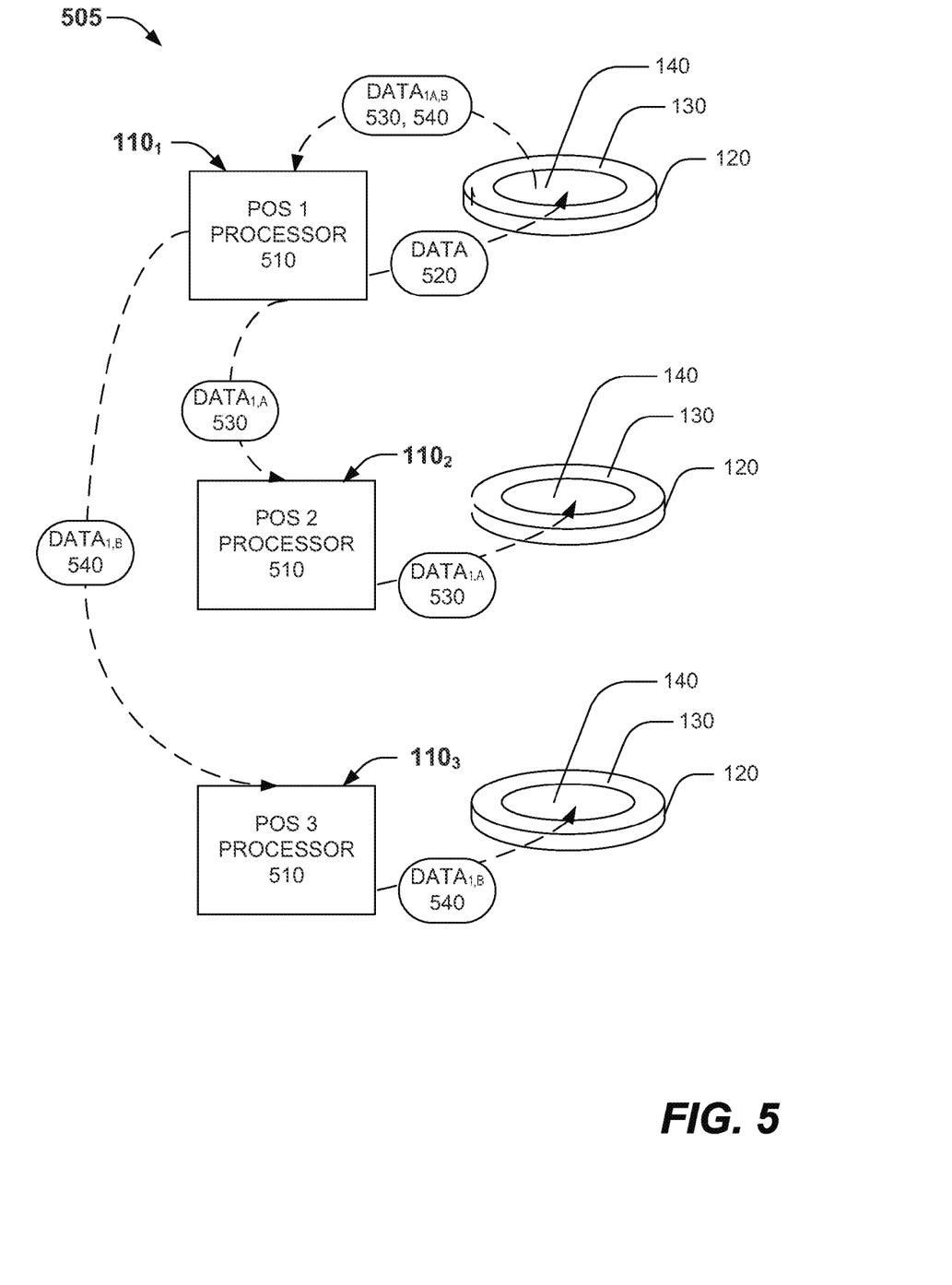
FIG. 5 is a block diagram depicting a system formed using three illustrative point of sale data apparatuses, according to one or more embodiments described herein.

FIG. 5 is a block diagram depicting a system 500 formed using three illustrative point of sale data devices $110_1$, $110_2$, and $110_3$, according to one or more embodiments. Each POS device $110_1$, $110_2$, and $110_3$ can include a processor 510 configured to execute one or more sets of machine executable instructions or logic, connected to a data storage device 120. The data storage device 120 can include a data storage 140 that is accessible to a plurality of externally connected POS apparatuses 500. The data storage device 120 can also include logic which when executed by the processor provides a point of sale terminal and access to the data storage within the plurality of externally connected POS apparatuses. The data storage 140 within the combined plurality of externally connected POS apparatuses can be addressed as a single logical volume, for example as a redundant array or independent disks (RAID) storage array. Additionally, the logic on the data storage device 120 can also provide for allocating at least a portion of the data within the resident data storage on at least one of the remaining plurality of externally connected POS apparatuses.

Referring to the non-limiting hypothetical example in FIG. 5, a transaction conducted at POS 1 can generate transactional data 520. A first portion of the transactional data can be stored on the data storage device 120 coupled to POS 1. Logic, for example logic creating a striped RAID array using POS 1, POS 2, and POS 3, can be executed. The execution of the logic can apportion the transactional data into two additional portions a second portion (tagged $DATA_{1,A}$) 530 and a third portion (tagged $DATA_{1,B}$) 540.

The second portion of the transactional data 530, (tagged $DATA_{1,A}$) can be transmitted to externally connected POS 2, $110_2$. The second portion of the transactional data 530 can be transmitted over an external network such as a WiFi, cellular, or Ethernet or over a captive network such as a USB or SATA based network. Upon receipt of the second portion of the transactional data 530, POS 2 writes the data to the coupled data storage device 120.

In a like manner, the third portion of the transactional data 540, (tagged $DATA_{1,B}$) can be transmitted to externally connected POS 3, $110_3$. The third portion of the transactional data 540 can likewise be transmitted over an external network such as a WiFi, cellular, or Ethernet or over a captive network such as a USB or SATA based network. In at least some embodiments, two or more networks can be used to couple the plurality of coupled POS devices 110. Upon receipt of the third portion of the transactional data 540, POS 3 writes the data to the coupled data storage device 120.

What is claimed is:

1. A point of sale (POS) data system, comprising:
a plurality of coupled POS devices, each respective one of the plurality of coupled POS devices including:
 a processor; and
 a data storage device comprising:
  POS logic which, when executed by the processor, enables POS functionality;
  data storage storing POS transactional data generated by the respective POS device, the POS transactional data being accessible by at least one other coupled POS device of the plurality of coupled POS devices; and
  system logic enabling master control for the plurality of coupled POS devices, wherein the system logic, when executed by the processor, causes the respective coupled POS device to:
   duplicate the POS transactional data generated by the plurality of coupled POS devices for selective storage on the at least one other coupled POS device; and
   based on a fault in the respective coupled POS device being detected by a second one of the plurality of coupled POS devices, transfer master control for the plurality of coupled POS devices to the second coupled POS device.

2. The POS data system of claim 1:
wherein the data storage device includes a plurality of partitions, including a first partition and a second partition;
wherein the POS logic is disposed within the first partition; and
wherein the data storage is disposed in the second partition.

3. The POS data system of claim 1, wherein the executed system logic enabling master control causes the respective coupled POS device to establish the plurality of coupled POS devices as a redundant array of independent disks (RAID) utilizing at least a portion of the data storage of each of the plurality of coupled POS devices.

4. The POS data system of claim 3, wherein the executed system logic causes the respective coupled POS device to duplicate the POS transactional data by mirroring the POS transactional data across a plurality of the data storage devices of the RAID.

5. The POS data system of claim 3, wherein the executed system logic causes the respective coupled POS device to duplicate the POS transactional data by striping the POS transactional data across a plurality of data storage devices of the RAID.

6. The POS data system of claim 1, wherein the second coupled POS device comprises a secondary master POS device that monitors the respective coupled POS device for the fault based on the respective coupled POS device having master control.

7. The POS data system of claim 6, wherein upon transferring master control for the plurality of coupled POS devices to the second coupled POS device, the executed system logic causes the POS data system to assign a new secondary master POS device, from the plurality of coupled POS devices, to monitor the second coupled POS device.

8. A point of sale (POS) data control method performed by a primary master POS device, selected from a plurality of coupled POS devices, the POS data control method comprising:
implementing a data storage device within each of the plurality of coupled POS devices, the data storage device of each of the plurality of POS devices comprising:
 POS logic which, when executed by a processor, provides POS functionality; and
 data storage storing POS transactional data generated by the respective POS device, the POS transactional data being accessible by at least one other coupled POS device of the plurality of coupled POS devices;
duplicating the POS transactional data generated by the plurality of coupled POS devices for selective storage on the data storage of the at least one other coupled POS device;
based on a fault being detected in the primary master POS device, transferring master control of the POS data control method to a secondary master POS device from the plurality of coupled POS devices, the fault being detected by the secondary master POS device.

9. The method of claim 8, further comprising:
establishing the plurality of coupled POS devices as a redundant array of inexpensive disks (RAID) by using at least a portion of the data storage of each of the plurality of coupled POS devices.

10. The method of claim 9, wherein duplicating the POS transactional data comprises mirroring the POS transactional data across a plurality of the data storage devices of the RAID.

11. The method of claim 9, wherein duplicating the POS transactional data comprises striping the POS transactional data across a plurality of the data storage devices of the RAID.

12. The POS data control method of claim 8, wherein the secondary master POS device monitors the primary master POS device for the fault based on the primary master POS device having master control.

13. The POS data control method of claim 12, wherein upon transferring master control for the plurality of coupled POS devices to the secondary master POS device, a new secondary master POS device, from the plurality of coupled POS devices, is assigned to monitor the secondary master POS device.

14. A point of sale (POS) apparatus comprising:
a processor; and
a data storage device including:
   data storage storing POS transactional data generated by the POS apparatus, the data storage being connected to a plurality of interconnected POS apparatuses; and
   system logic enabling master control for the plurality of interconnected POS apparatuses, wherein the system logic, when executed by the processor, causes the POS apparatus to:
      utilize data storage devices of the plurality of interconnected POS apparatuses as a single logical volume;
      duplicate the POS transactional data generated by the plurality of interconnected POS apparatuses and the POS apparatus for selective storage on at least one other interconnected POS device of the plurality of interconnected POS apparatuses;
      based on a fault in the POS apparatus being detected by a second one of the plurality of interconnected POS apparatuses, transfer master control for the plurality of interconnected POS apparatuses to the second interconnected POS apparatus.

15. The POS apparatus of claim 14, wherein the single logical volume comprises a redundant array of independent disks (RAID) having at least a portion of the data storage device of each of the plurality of interconnected POS apparatuses being accessible by (i) the POS apparatus, and (ii) the second interconnected POS apparatus upon receiving master control.

16. The POS apparatus of claim 15, wherein executed system logic causes the POS apparatus to duplicate the POS transactional data by mirroring the POS transactional data across a plurality of the data storage devices of the RAID.

17. The POS apparatus of claim 15, wherein executed system logic causes the POS apparatus to duplicate the POS transactional data by striping the POS transactional data across a plurality of the data storage devices of the RAID.

18. The POS apparatus of claim 14, wherein the second interconnected POS apparatus comprises a secondary master POS device that monitors the POS apparatus for the fault based on the POS apparatus having master control.

19. The POS apparatus of claim 18, wherein upon transferring master control for the plurality of coupled POS devices to the second interconnected POS apparatus, a new secondary master POS device, from the plurality of coupled POS devices, is assigned to monitor the second POS apparatus.

* * * * *